United States Patent
Kim et al.

(10) Patent No.: US 8,413,491 B2
(45) Date of Patent: Apr. 9, 2013

(54) APPARATUS AND METHOD FOR MEASURING CENTER OF GRAVITY OF SLABS

(75) Inventors: Joo Man Kim, Pohang-si (KR); Dong Wook Kim, Pohang-si (KR); Young Soo Kim, Pohang-si (KR); Young Ho Hur, Pohang-si (KR); Ki Kwan Park, Pohang-si (KR)

(73) Assignee: Posco, Pohang (KR)

( * ) Notice: Subject to any disclaimer, the term of this patent is extended or adjusted under 35 U.S.C. 154(b) by 0 days.

(21) Appl. No.: 12/670,553

(22) PCT Filed: Aug. 8, 2008

(86) PCT No.: PCT/KR2008/004643
§ 371 (c)(1), (2), (4) Date: Aug. 16, 2010

(87) PCT Pub. No.: WO2009/020375
PCT Pub. Date: Feb. 12, 2009

(65) Prior Publication Data
US 2011/0036154 A1   Feb. 17, 2011

(30) Foreign Application Priority Data
Aug. 8, 2007   (KR) .................. 10-2007-0079646

(51) Int. Cl.
*G01M 1/00*   (2006.01)
(52) U.S. Cl. ..................................... 73/65.01
(58) Field of Classification Search .................. 73/65.01
See application file for complete search history.

(56) References Cited

U.S. PATENT DOCUMENTS
4,499,383 A   2/1985   Loose

FOREIGN PATENT DOCUMENTS
| | | | |
|---|---|---|---|
| DE | 19846709 | * | 4/2000 |
| JP | 1242392 A | | 9/1989 |
| JP | 5215513 A | | 8/1993 |
| JP | 7330287 A | | 12/1995 |
| KR | 1020000019784 A | | 4/2000 |

* cited by examiner

*Primary Examiner* — Lisa Caputo
*Assistant Examiner* — Octavia Davis-Hollington
(74) *Attorney, Agent, or Firm* — The Webb Law Firm (57) ABSTRACT

Disclosed herein is an apparatus and method for measuring the center of gravity of slabs. The apparatus for measuring the center of gravity of slabs includes a main system, a gravity center measurement system, and an unmanned crane. The main system provides information about the dimensions and/or weight of each of a plurality of slabs loaded in a vehicle. The gravity center measurement system includes a photographing unit for photographing the loaded slabs to be moved, a driving unit for moving the photographing unit up and down, and a control unit for calculating the center of gravity and grip position of all of the slabs, to be moved each time, based on information about a position and configuration of each of the slabs from the photographing unit and the information about the dimensions and/or weight of each of the slabs from the main system. The unmanned crane grips and moves the slabs according to the grip position information calculated by the gravity center measurement system.

3 Claims, 6 Drawing Sheets

APPARATUS AND METHOD FOR MEASURING CENTER OF GRAVITY OF SLABS

TECHNICAL FIELD

The present invention relates generally to an apparatus and method for measuring the center of gravity of slabs, and, more particularly, to an apparatus and method for measuring the center of gravity of slabs that can rapidly and conveniently calculate the center of gravity of slabs, to be gripped by an unmanned crane, using configuration data based on the position and loaded state of the slabs moved by a vehicle, thereby preventing the erroneous operation of the unmanned crane and accidents attributable to the use of the unmanned crane.

BACKGROUND ART

A system for controlling a typical unmanned crane includes a task instruction system configured to have a work schedule for the operation of a fully automatic unmanned crane and various data for the work schedule, a gravity center measurement system configured to wirelessly communicate with the task instruction system, and an unmanned crane configured to operate under the control of the gravity center measurement system.

The gravity center measurement system processes information (the type, size, etc. of slabs loaded in an arriving vehicle) received from the task instruction system, and moves the unmanned crane back and forth and sideways based on the processed information.

When a vehicle in which slabs are loaded arrives, the prior art gravity center measurement system operates the unmanned crane such that the slabs loaded in the vehicle can be moved to a destination using information received from the task instruction system. At this time, the unmanned crane moves one slab loaded in the vehicle, or two or more slabs loaded in the vehicle at the same time.

When the unmanned crane moves the slabs, the unmanned crane moves the slabs to a destination while gripping the slabs. At this time, in order to prevent dropping of the slabs, the slabs must be accurately gripped at the location of the center of gravity of the slabs.

The unmanned crane is operated under the control of the gravity center measurement system that receives information from the task instruction system. If the information differs from the type of slabs loaded in a vehicle, the stop position of the vehicle or the loaded state of the slabs, the unmanned crane cannot grip the slabs at the accurate center of gravity thereof when gripping the slabs, with the result that, when the slabs are moved, they are inclined to one side and then dropped. Accordingly, there are problems in that expensive finished products may become damaged and fatal accidents and disasters may also occur.

SUMMARY OF THE INVENTION

Accordingly, the present invention has been made keeping in mind the above problems occurring in the prior art, and an object of the present invention is to provide an apparatus and method for measuring the center of gravity of slabs that can photograph slabs loaded in a vehicle, and accurately calculate the center of gravity of the slabs based on the configuration of the slabs in order to enable an unmanned crane to grip the slabs, thereby preventing dropping of the slabs attributable to the un-balanced weight of the slabs.

In order to accomplish the above object, the present invention provides an apparatus for measuring the center of gravity of slabs, the apparatus including a main system for providing information about the dimensions and/or weight of each of a plurality of slabs loaded in a vehicle; a gravity center measurement system, including a photographing unit for photographing the loaded slabs to be moved, a driving unit for moving the photographing unit up and down, and a control unit for calculating the center of gravity and grip position of all of the slabs, to be moved each time, based on information about a position and configuration of each of the slabs from the photographing unit and the information about the dimensions and/or weight of each of the slabs from the main system; and an unmanned crane for gripping and moving the slabs based on the grip position information calculated by the gravity center measurement system.

In order to accomplish the above object, the present invention provides a method of measuring the center of gravity of slabs, including a first step of, when a vehicle in which slabs to be moved are loaded arrives, receiving information about the dimensions and/or weight Pi of each of the slabs loaded in the vehicle from a main system; a second step of scanning the slabs using an image scanner, obtaining information about a position and configuration of each of the slabs from images of the scanned slabs, and calculating the center of gravity of each of the slabs Ci based on the information about the position and configuration; a third step of calculating the center of gravity Ct and grip position of all of the slabs, to be moved each time, based on the information about the slabs obtained at the first and second steps; and a fourth step of gripping and moving the slabs using an unmanned crane according to the grip position information obtained at the third step.

According to the present invention, when slabs loaded and moved in a vehicle are gripped using an unmanned crane, the center of gravity of the slabs can be measured rapidly and accurately and the unmanned crane can grip the slabs at the center of gravity thereof, thereby providing an advantage of preventing dropping of the slabs attributable to the unbalanced weight of the slabs.

Furthermore, in the case in which slabs loaded and moved in a vehicle are bent, the grip position of an unmanned crane can be changed, thereby providing an advantage of preventing a grip failure.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

The present invention will now be described in detail in connection with preferred embodiments with reference to the accompanying drawings.

Figure 1:
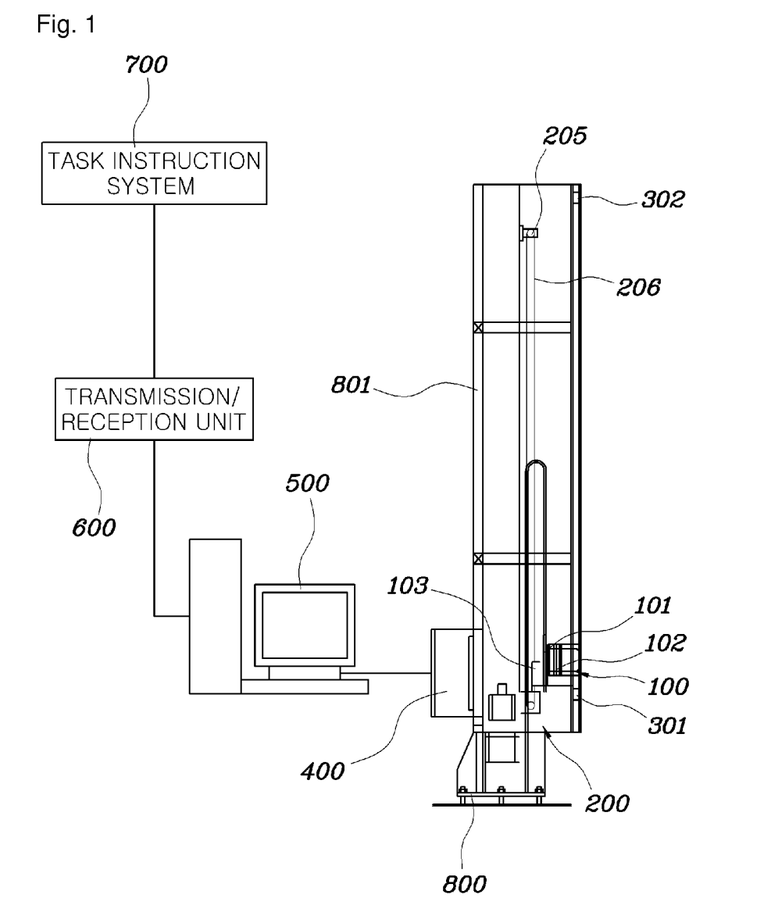
FIG. 1 is a side view showing an apparatus for measuring the center of gravity of slabs according to the present invention.
Figure 2:
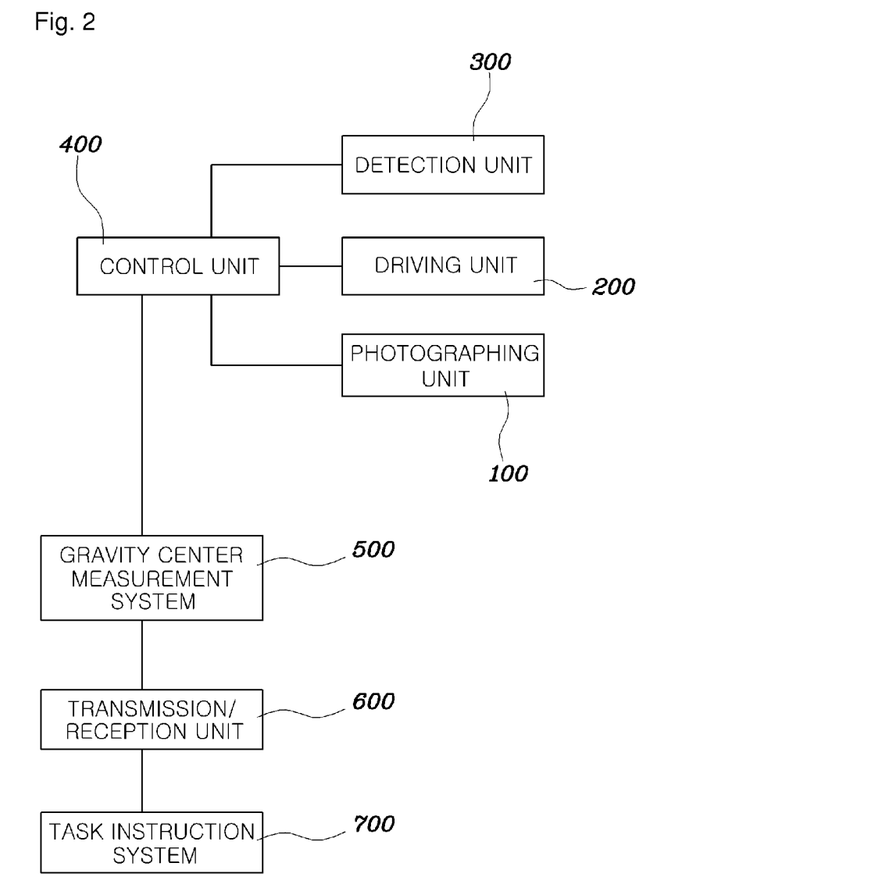
FIG. 2 is a block diagram showing the apparatus for measuring the center of gravity of slabs according to the present invention.
Figure 3:
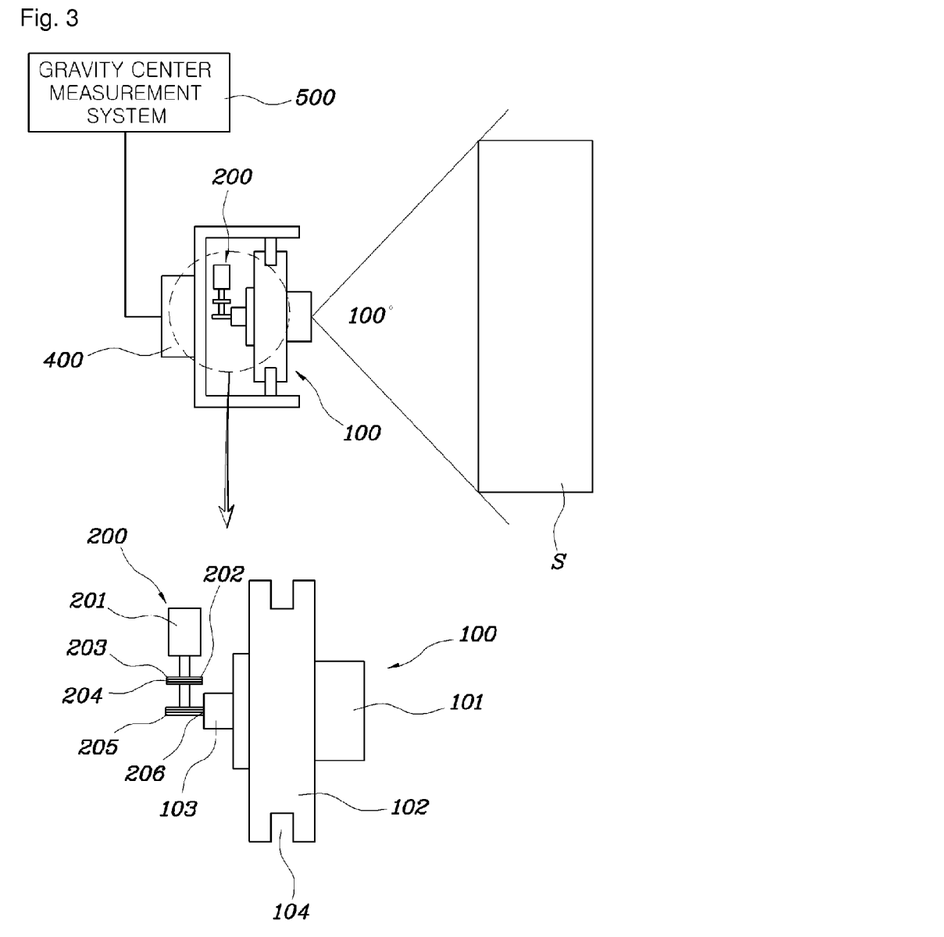
FIG. 3 is a plan view showing the operational state of the apparatus for measuring the center of gravity of slabs according to the present invention.
Figure 4:
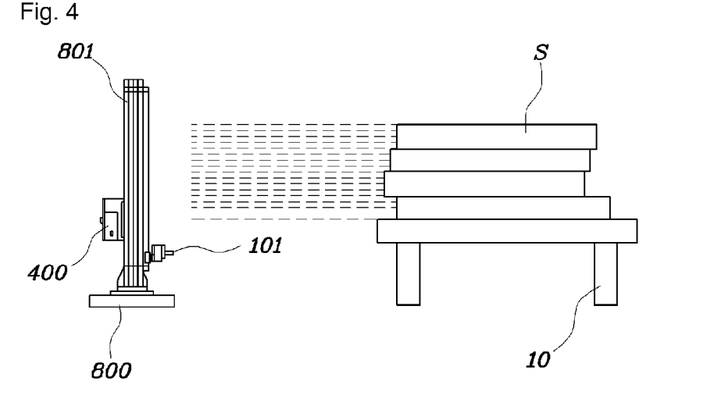
FIG. 4 is a side view showing the operational state of the apparatus for measuring the center of gravity of slabs according to the present invention.
Figure 5:
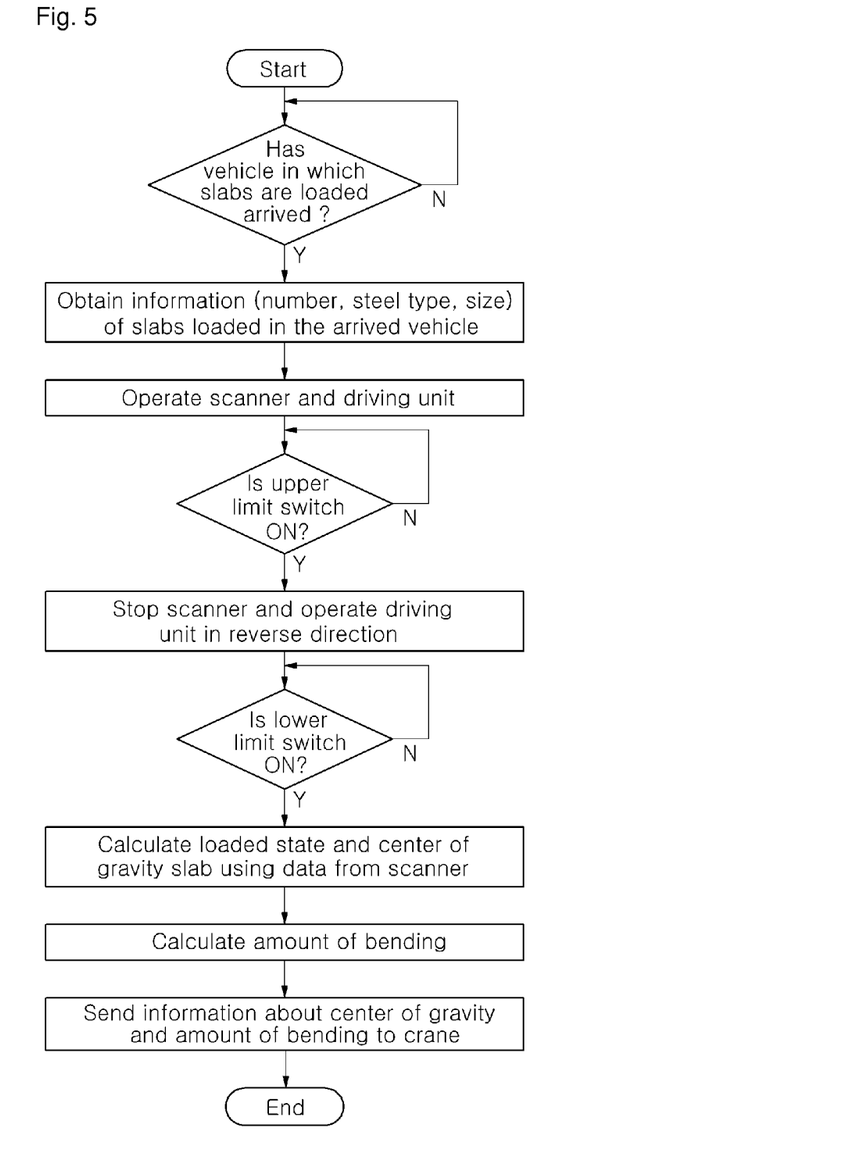
FIG. 5 is a flowchart showing a method of recognizing the configuration of slabs according to the present invention.
Figure 6:
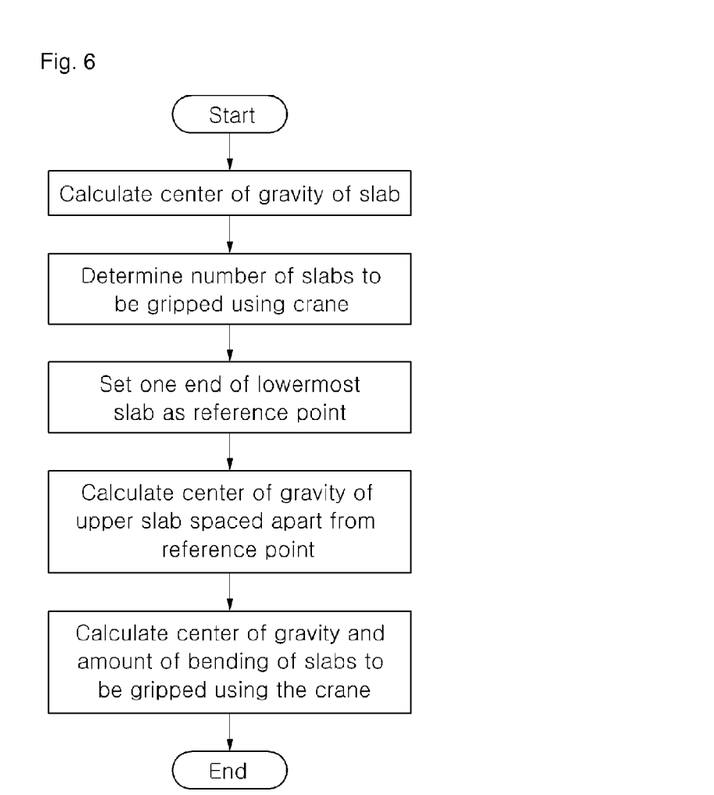
FIG. 6 is a flowchart showing a process of calculating the center of gravity in the method of recognizing the configuration of slabs according to the present invention.
Figure 7:
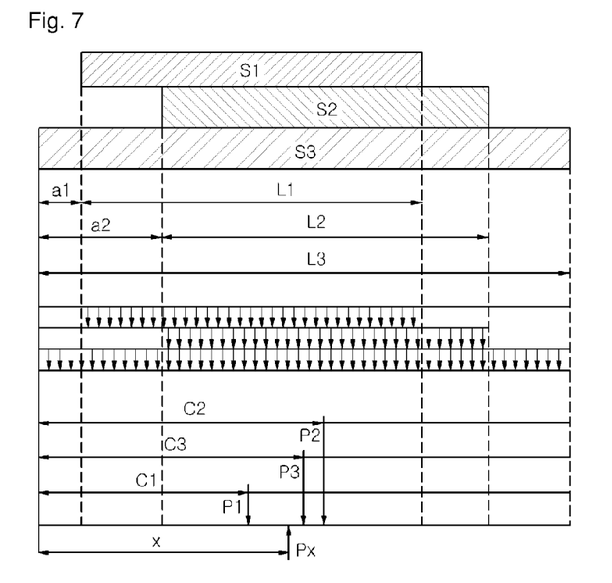
FIG. 7 is a graph showing the center of gravity of slabs calculated by the method of recognizing the configuration of slabs according to the present invention.
Figure 8:
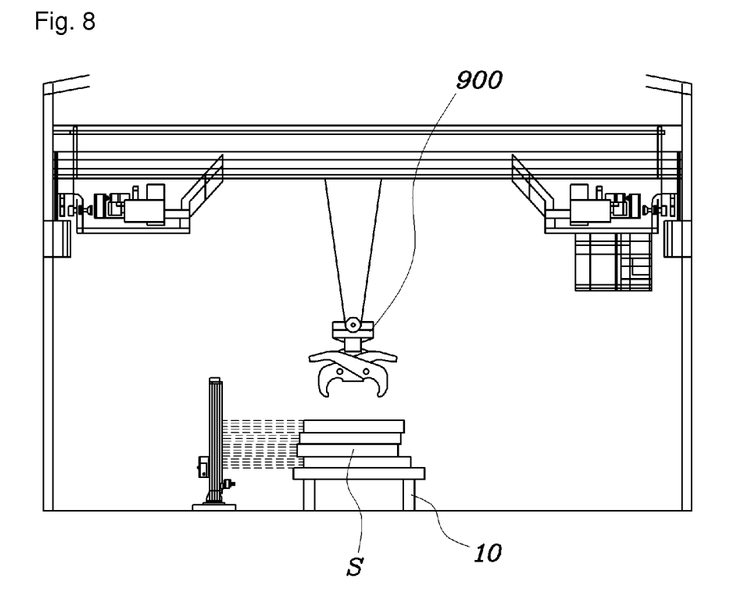
FIG. 8 is a side view showing a state in which slabs are moved by a ceiling crane.
Figure 9:
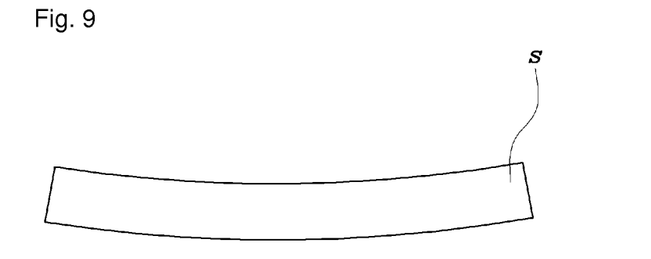
FIGS. 9 and 10 are side views showing the bent states of slabs.
Figure 10:
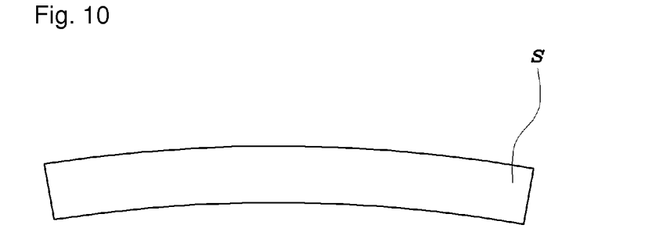

FIG. 1 is a side view showing an apparatus for measuring the center of gravity of slabs according to the present invention. FIG. 2 is a block diagram showing the apparatus for measuring the center of gravity of slabs according to the present invention. FIG. 3 is a plan view showing the operational state of the apparatus for measuring the center of gravity of slabs according to the present invention. FIG. 4 is a side view showing the operational state of the apparatus for measuring the center of gravity of slabs according to the present invention. FIG. 5 is a flowchart showing a method of recognizing the configuration of slabs according to the present invention. FIG. 6 is a flowchart showing a process of calculating the center of gravity in the method of recognizing the configuration of slabs according to the present invention. FIG. 7 is a graph showing the center of gravity of slabs calculated by the method of recognizing the configuration of slabs according to the present invention. FIG. 8 is a side view showing a state in which slabs are moved by a ceiling crane. FIGS. 9 and 10 are side views showing the bent states of slabs.

Referring to the above drawings, a slab image recognition apparatus according to the present invention includes a photographing unit 100 for photographing slabs S loaded in a vehicle 10, a driving unit 200 for moving the photographing unit 100 up and down, a detection unit 300 for limiting the amount of up/down movement of the photographing unit 100, a control unit 400 for controlling the operation of the photographing unit 100 and the driving unit 200, and a gravity center measurement system 500 for extracting an image of the loaded state of the slabs S based on data acquired by the photographing unit 100, and calculating the center of gravity of the slabs S. The elements are installed at a base 800 on the ground and at a plurality of support posts 801 on a top surface of the base 800.

Meanwhile, the gravity center measurement system 500 is preferably connected to a transmission/reception unit 600 in order to transmit/receive data to/from a task instruction system 700.

The photographing unit 100 includes a scanner 101 for photographing the slabs S, a bracket 102 for supporting the scanner 101, and a fastening member 103 disposed on one side of the bracket 102. A wire 206, which will be described later, is coupled to the fastening member 103. Fitting grooves 104, which will be fitted over the support post 801, are formed in both sides of the bracket 102.

The driving unit 200 is provided with a driving motor 201 for generating torque. The driving motor 201 is disposed on a top surface of the base 800. A driving pulley 202 is installed in the driving motor 201. The driving pulley 202 is coupled to a driven pulley 203 through a belt 204.

Furthermore, a plurality of idle rolls 205 is disposed inside a support post 801. Any one of the idle rolls 205 is coupled to the driven pulley 203 through a rotation shaft such that the idle roll 205 can be rotated together with the driven pulley 203. The idle rolls 205 are surrounded by the wire 206, and the wire 206 is coupled to the fastening member 103 of the photographing unit 100.

The detection unit 300 is configured to limit the amount of up/down movement of the photographing unit 100. A lower limit switch 301 is installed in the support post 801 at the lowermost location to which the photographing unit 100 can be move, while an upper limit switch 302 is installed in the support post 801 at the uppermost location to which the photographing unit 100 can be moved.

A method of measuring the center of gravity of slabs using the apparatus, constructed as described above, according to the present invention is described below in detail.

First, it is checked whether the vehicle 10 in which the slabs S are loaded has arrived. If, as a result of the checking, it is determined that the vehicle 10 has arrived, the gravity center measurement system 500 performs a first step of receiving information about the number, steel type, size and weight of the slabs S loaded in the vehicle through communication with the task instruction system 700.

After the information about the slabs S has been received in the first step, the gravity center measurement system 500 performs a second step of photographing the loaded state and location of the slabs S which are loaded in the vehicle 10. Here, the control unit 400 that has received a control signal from the gravity center measurement system 500 controls the photographing unit 100 and the driving unit 200.

The angular range photographing of the scanner 101 is 100°, as illustrated in FIG. 3. The scanner 101 is rotated in steps of 0.25° such that it can photograph 400 points on the same line.

The angular range of 100° and rotation amount of 0.25° of the scanner 101 may be changed depending on the distance between the scanner 101 and the slabs S. When the length of the slabs S increases, two or more scanners 101 may be installed.

Meanwhile, after the angular range of 100° has been photographed by the scanner 101, the driving motor 201 is operated and torque is transmitted to the driven pulley 203 through the driving pulley 202 and the belt 204.

When the driven pulley 203 is rotated, the idle rolls 205 coupled to the driven pulley 203 are rotated. Thereafter, when the torque of the idle rolls 205 is transmitted to the wire 206, the photographing unit 100 coupled to the wire 206 is moved up and down.

The driving motor 201 is driven to move the photographing unit 100 upward a specific distance (about 10 mm), and then stops. When the driving motor 201 is stopped, the scanner 101 performs photographing in the same manner as described above.

Meanwhile, the moving distance (about 10 mm) of the scanner 101 can be decreased or increased depending on the desired accuracy of an image to be captured.

After the photographing unit 100 photographs all of the loaded slabs S by repeating the above process and activates the upper limit switch 302, the scanner 101 is stopped and the driving motor 201 is driven in a reverse direction, so that the photographing unit 100 moves downward. When the photographing unit 100 moves downward and activates the lower limit switch 301, the driving motor 201 is stopped, and the gravity center measurement system 500 performs a third step.

Here, when the photographing unit 100 moves up or down, the photographing unit 100 can move stably without lateral movement because the support post 801 is inserted into the fitting grooves 104 formed in both sides of the bracket 102.

The data photographed by the scanner 101 includes information about the position and configuration of each of the loaded slabs, which includes one or more of the length, thickness, and amount of bending of each slab. The data is transmitted to the gravity center measurement system 500, and is used to perform the third step of calculating the loaded state and center of gravity of the slabs S based on the data.

The loaded state of the slabs S can be determined based on the photographed data. FIG. 7 illustrates an example of the loaded state of the slabs S. In this case, a process of calculating the center of gravity of the loaded slabs S is described below.

First, the center of gravity C of a slab S is calculated by Equation 1:

$$C=L/2$$

where L is the length of the slab.

Meanwhile, when the position of the center of gravity of each slab, shown in FIG. 7, is calculated, the distance from any one point (a reference point) is obtained. Here, one end of a slab S loaded at the bottom is preferably used as a reference point. Meanwhile, the distance to the center of gravity of each slab is calculated by Equation 2:

$$Ci=ai+Li/2$$

where 'ai' is the distance from the reference point to one end of each slab and Li is the length of each slab.

Accordingly, the distance to the center of gravity of each slab S is as follows:

$$C1=a1+(L1/2)$$

$$C2=a2+(L2/2)$$

$$C3=a3+(L3/2)$$

As described above, after the center of gravity of each slab S has been calculated, a process of determining the number of the slabs S to be gripped by the unmanned crane 900 is performed. Here, one end of the slab S, which belongs to the slabs S and is located at the bottom, is set as a reference point.

Furthermore, the distance from the reference point to the center of gravity of the slabs S, that is, a position at which the slabs can be gripped by the unmanned crane 900, is calculated. In this case, the distance is calculated by Equation 3:

$$Ct = \frac{\sum_{i=0}^{n}(Pi*Ci)}{\sum_{i=0}^{n}Pi}$$

where 'Pi' is the weight of each slab, and 'n' is the number of slabs.

After the center of gravity of the slabs has been calculated by Equation 3, the gravity center measurement system 500 performs a fifth step of gripping the slabs S at the center of gravity thereof using the unmanned crane 900 and moving the slabs S. As illustrated in FIG. 8, the unmanned crane 900 accurately grips the slabs S at the center of gravity thereof when gripping the slabs S loaded in the vehicle 10 and moves the slabs S to a destination, thereby preventing dropping of the slabs attributable to the un-balanced weight of the slabs S.

Meanwhile, in the case in which a slab S is bent so that the central portion thereof is depressed, as illustrated in FIG. 9 or so that the central portion thereof is raised, as illustrated in FIG. 10, a grip failure may occur due to the bending when the unmanned crane 900 grips the slabs.

In order to prevent a grip failure attributable to such bending, after the center of gravity of the slabs S has been calculated, the amount of bending of the slabs S can be calculated using an image of the slabs S, and information about the amount of bending of the slabs S can be transmitted to the unmanned crane 900, thereby preventing a grip failure attributable to bending.

Alternatively, the gravity measuring system 500 can be configured to compare information about the position and configuration of each slab, which is obtained through the photographing unit 100, with information about each slab, which is received from the task instruction system 700, determine that error has occurred if, as a result of the comparison, the length or thickness of the slab is different from corresponding information, and transmit information about the occurrence of the error to the task instruction system 700.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of measuring a center of gravity of slabs, the method comprising:
   a first step of, when a vehicle in which slabs to be moved are loaded arrives, receiving information about dimensions or weight Pi of each of the slabs loaded in the vehicle from a main system;
   a second step of scanning the slabs using an image scanner, obtaining information about a position and configuration of each of the slabs from images of the scanned slabs, and calculating a center of gravity of each of the slabs Ci based on the information about the position and configuration;
   a third step of calculating a center of gravity Ct and grip position of all of the slabs, to be moved each time, based on the information about the slabs obtained at the first and second steps; and,
   a fourth step of gripping and moving the slabs using an unmanned crane according to the grip position information obtained at the third step,
   wherein the information about the position and configuration obtained at the second step comprises one or more of a length, thickness, and amount of bending of each slab, and
   wherein the center of gravity Ci of each slab calculated at the second step is calculated by the following equation by using a distance ai from an arbitrarily selected reference point to one end of each slab in a length direction and a length Li of each slab:

$$Ci=ai+Li/2.$$

2. The method as set forth in claim 1, wherein the center of gravity Ct of all of the slabs calculated at the third step is calculated through the following equation using the center of gravity Ci of each slab and a weight Pi of each slab:

$$Ct = \frac{\sum_{i=0}^{n}(Pi*Ci)}{\sum_{i=0}^{n}Pi}.$$

3. The method as set forth in claim 1, wherein the information about each slab obtained at the second step is compared with the information about each slab received from the main system at the first step, it is determined that an error has occurred if, as a result of the comparison, a length or thickness of any slab differs, and information about occurrence of the error is transmitted to the main system.

* * * * *

UNITED STATES PATENT AND TRADEMARK OFFICE
CERTIFICATE OF CORRECTION

PATENT NO.       : 8,413,491 B2
APPLICATION NO.  : 12/670553
DATED            : April 9, 2013
INVENTOR(S)      : Joo Man Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 340 days.

Signed and Sealed this
Eighth Day of July, 2014

Michelle K. Lee
*Deputy Director of the United States Patent and Trademark Office*

UNITED STATES PATENT AND TRADEMARK OFFICE
CERTIFICATE OF CORRECTION

PATENT NO.       : 8,413,491 B2                              Page 1 of 1
APPLICATION NO.  : 12/670553
DATED            : April 9, 2013
INVENTOR(S)      : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 583 days.

Signed and Sealed this
First Day of September, 2015

Michelle K. Lee
*Director of the United States Patent and Trademark Office*